(12) United States Patent
Islam et al.

(10) Patent No.: US 10,517,067 B2
(45) Date of Patent: Dec. 24, 2019

(54) TECHNIQUES AND APPARATUSES FOR PROVIDING NOTIFICATIONS IN SHORT PAGING MESSAGES

(71) Applicant: QUALCOMM Incorporated, San Diego, CA (US)

(72) Inventors: Muhammad Nazmul Islam, Edison, NJ (US); Tao Luo, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/141,631

(22) Filed: Sep. 25, 2018

(65) Prior Publication Data

US 2019/0313365 A1 Oct. 10, 2019

Related U.S. Application Data

(60) Provisional application No. 62/654,044, filed on Apr. 6, 2018.

(51) Int. Cl.
| | |
|---|---|
| *H04M 11/04* | (2006.01) |
| *H04W 68/02* | (2009.01) |
| *H04W 72/04* | (2009.01) |
| *H04W 4/90* | (2018.01) |
| *H04W 48/12* | (2009.01) |

(52) U.S. Cl.
CPC .............. *H04W 68/02* (2013.01); *H04W 4/90* (2018.02); *H04W 48/12* (2013.01); *H04W 72/042* (2013.01)

(58) Field of Classification Search
CPC ... H04W 68/02; H04W 48/12; H04W 72/042; H04W 4/90
USPC ........................................................ 455/404.1
See application file for complete search history.

(56) References Cited

U.S. PATENT DOCUMENTS

| 8,989,784 B2* | 3/2015 | Clevorn | H04W 68/005 |
| | | | 455/458 |
| 9,485,664 B2* | 11/2016 | Jha | H04W 16/14 |
| 9,872,272 B2* | 1/2018 | Mochizuki | H04W 68/02 |

(Continued)

FOREIGN PATENT DOCUMENTS

| EP | 3364689 A1 | 8/2018 |
| WO | 2017078023 A1 | 5/2017 |

OTHER PUBLICATIONS

International Search Report and Written Opinion—PCT/US2019/016785—ISA/EPO—dated Mar. 26, 2019.

(Continued)

*Primary Examiner* — Amancio Gonzalez
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive a paging grant that includes a short paging message and a notification of a reason that the short paging message was triggered; determine that the paging grant includes the short paging message; and obtain the notification of the reason that the short paging message was triggered based at least in part on determining that the paging grant includes the short paging message. Numerous other aspects are provided.

41 Claims, 7 Drawing Sheets

(56) References Cited

U.S. PATENT DOCUMENTS

| | | |
|---|---|---|
| 10,028,247 B2* | 7/2018 | Better .................. H04W 68/02 |
| 2017/0105166 A1 | 4/2017 | Lee et al. |
| 2017/0280481 A1 | 9/2017 | Stern-Berkowitz et al. |

OTHER PUBLICATIONS

NTT DOCOMO: "Views on Remaining Issues of DCI", 3GPP Draft; R1-157344 Views on Remaining Issues of DCI, 3rd Generation Partnership Project (3GPP), Mobile Competence Centre; 650, Route Des Lucioles; F-06921 Sophia-Antipolis Cedex; France, vol. RAN WG1, No. Anaheim, USA; Nov. 15, 2015-Nov. 22, 2015 Nov. 7, 2015, XP051022747, Retrieved from the Internet: URL:http://www.3gpp.org/ftp/tsg_ran/WG1_RL1/TSGR1_83/Docs/ [retrieved on Nov. 7, 2015], 4 pages.

* cited by examiner

TECHNIQUES AND APPARATUSES FOR PROVIDING NOTIFICATIONS IN SHORT PAGING MESSAGES

CROSS-REFERENCE TO RELATED APPLICATIONS UNDER 35 U.S.C. § 119

This application claims priority to U.S. Provisional Patent Application No. 62/654,044, filed on Apr. 6, 2018, entitled "TECHNIQUES AND APPARATUSES FOR PROVIDING NOTIFICATIONS IN SHORT PAGING MESSAGES," which is hereby expressly incorporated by reference herein.

FIELD OF THE DISCLOSURE

Aspects of the present disclosure generally relate to wireless communication, and more particularly to techniques and apparatuses for providing notifications in short paging messages.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a paging grant that includes a short paging message and a notification of a reason that the short paging message was triggered; determining that the paging grant includes the short paging message; and obtaining the notification of the reason that the short paging message was triggered based at least in part on determining that the paging grant includes the short paging message.

In some aspects, a user equipment for wireless communication may include memory and one or more processors operatively coupled to the memory. The memory and the one or more processors may be configured to receive a paging grant that includes a short paging message and a notification of a reason that the short paging message was triggered; determine that the paging grant includes the short paging message; and obtain the notification of the reason that the short paging message was triggered based at least in part on determining that the paging grant includes the short paging message.

In some aspects, a non-transitory computer-readable medium may store one or more instructions for wireless communication. The one or more instructions, when executed by one or more processors of a user equipment, may cause the one or more processors to receive a paging grant that includes a short paging message and a notification of a reason that the short paging message was triggered; determine that the paging grant includes the short paging message; and obtain the notification of the reason that the short paging message was triggered based at least in part on determining that the paging grant includes the short paging message.

In some aspects, an apparatus for wireless communication may include means for receiving a paging grant that includes a short paging message and a notification of a reason that the short paging message was triggered; means for determining that the paging grant includes the short paging message; and means for obtaining the notification of the reason that the short paging message was triggered based at least in part on determining that the paging grant includes the short paging message.

In some aspects, a method of wireless communication, performed by a base station, may include determining a reason for triggering a short paging message; and transmitting a paging grant that includes the short paging message and a notification of the reason for triggering the short paging message.

In some aspects, a base station for wireless communication may include memory and one or more processors operatively coupled to the memory. The memory and the one or more processors may be configured to determine a reason for triggering a short paging message; and transmit a paging grant that includes the short paging message and a notification of the reason for triggering the short paging message.

In some aspects, a non-transitory computer-readable medium may store one or more instructions for wireless communication. The one or more instructions, when executed by one or more processors of a base station, may cause the one or more processors to determine a reason for triggering a short paging message; and transmit a paging grant that includes the short paging message and a notification of the reason for triggering the short paging message.

In some aspects, an apparatus for wireless communication may include means for determining a reason for triggering a short paging message; and means for transmitting a paging grant that includes the short paging message and a notification of the reason for triggering the short paging message.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
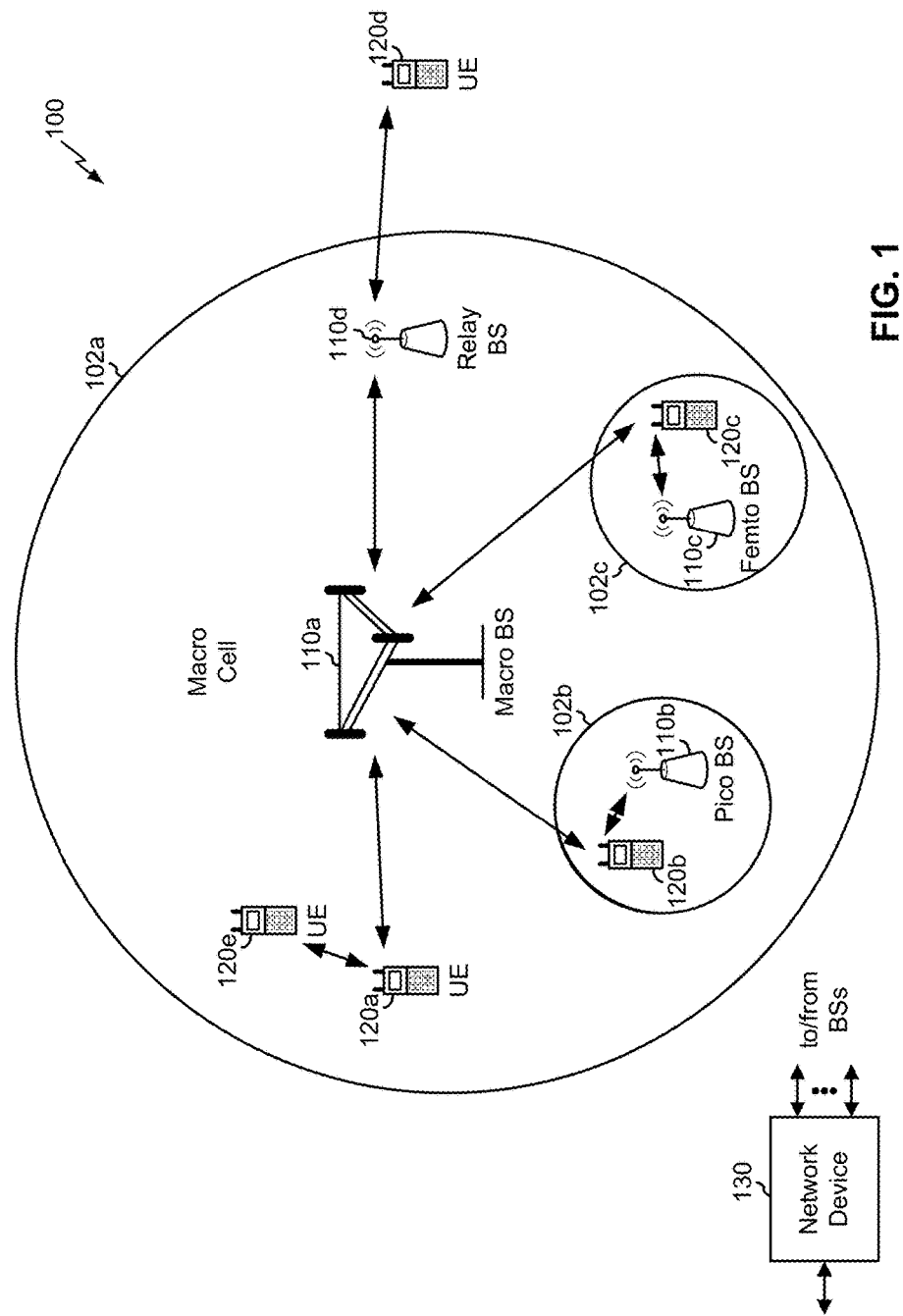
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

A network device 130 may couple to a set of BSs and may provide coordination and control for these BSs. Network device 130 may communicate with the BSs via a backhaul. The BSs may also communicate with one another, e.g., directly or indirectly via a wireless or wireline backhaul. In some aspects, the network device 130 may be included in a 3GPP core network accessible to a UE 120.

In some aspects, the network device 130 may include a mobility management entity (MME) (e.g., in a 4G/LTE core network), a device that performs an access and mobility management function (AMF) (e.g., in a 5G/NR core network), and/or the like. In this case, the network device 130 may manage authentication, activation, deactivation, and/or mobility functions associated with UE 120. For example, the network device 130 may facilitate the selection of a gateway (e.g., a serving gateway, a packet data network gateway, a user plane function, and/or the like) to serve traffic to and/or from a UE 120. Additionally, or alternatively, the network device 130 may perform operations associated with handing off the UE 120 from a first base station 110 to a second base station 110 when the UE 120 is transitioning from a first cell associated with the first base station 110 to a second cell associated with the second base station 110. Additionally, or alternatively, the network device 130 may select another network device 130, to which the UE 120 is to be handed off when the UE 120 moves out of range of the network device 130. In some aspects, the network device 130 may receive a public warning system (PWS) notification, may process the PWS notification, and may deliver (e.g., transmit) the PWS notification to one or more UEs 120 (e.g., via a base station 110), as described in more detail elsewhere herein. The PWS notification (also referred to as a PWS message) may include, for example, an earthquake and tsunami warning system (ETWS) notification (also referred to as an ETWS message), a commercial mobile alert system (CMAS) notification (also referred to as a CMAS message), and/or the like.

As indicated above, FIG. 1 is provided merely as an example. Other examples are possible and may differ from what was described with regard to FIG. 1.

Figure 2:
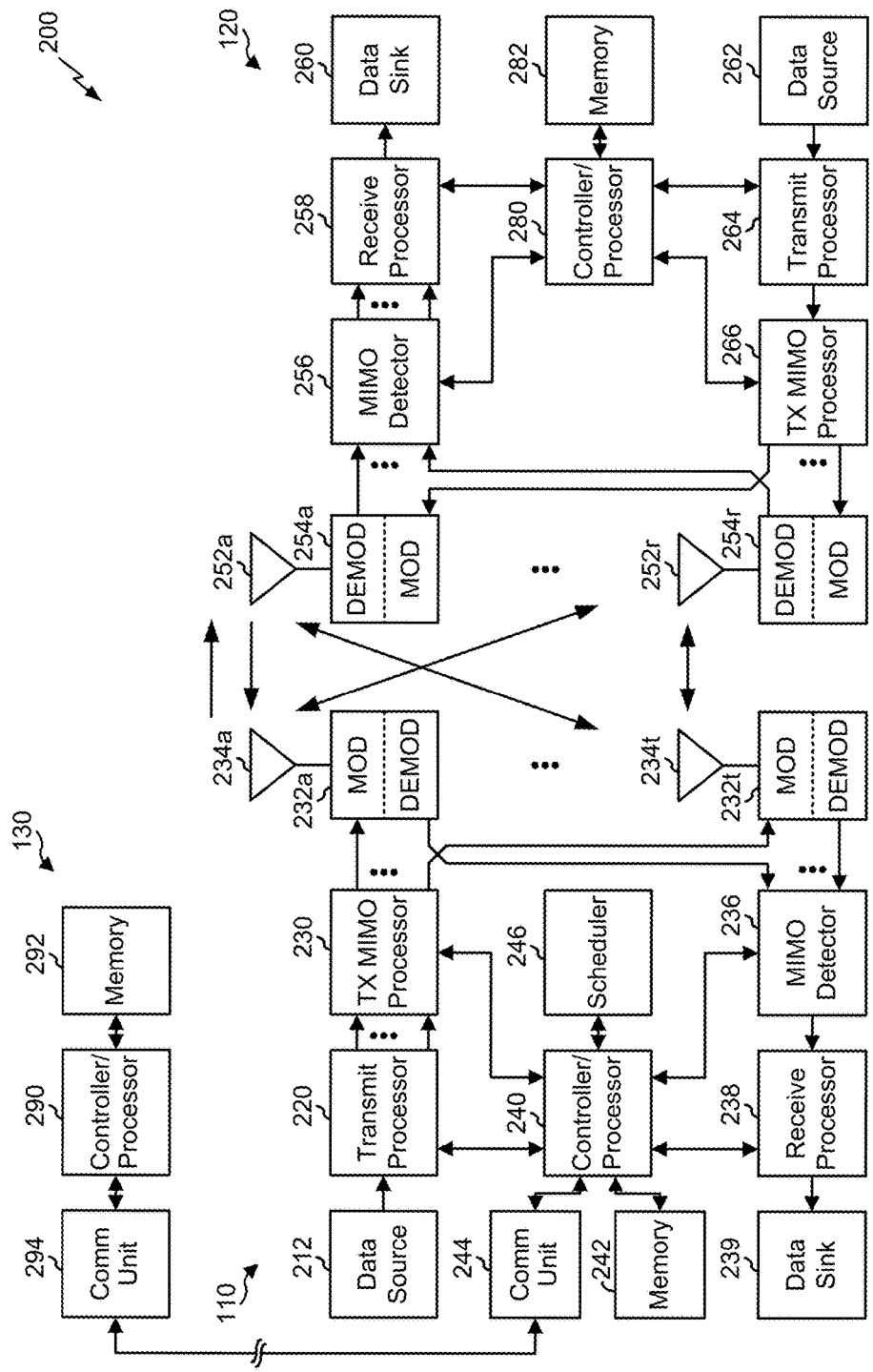
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network device 130 via communication unit 244. Network device 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with providing or receiving notifications in short paging messages, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a paging grant that includes a short paging message and a notification of a reason that the short paging message was triggered; means for determining that the paging grant includes the short paging message; means for obtaining the notification of the reason that the short paging message was triggered based at least in part on determining that the paging grant includes the short paging message; and/or the like. In some aspects, such means may include one or more components of UE 120 described in connection with FIG. 2.

In some aspects, base station 110 may include means for determining a reason for triggering a short paging message; means for transmitting a paging grant that includes the short paging message and a notification of the reason for triggering the short paging message; and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3:
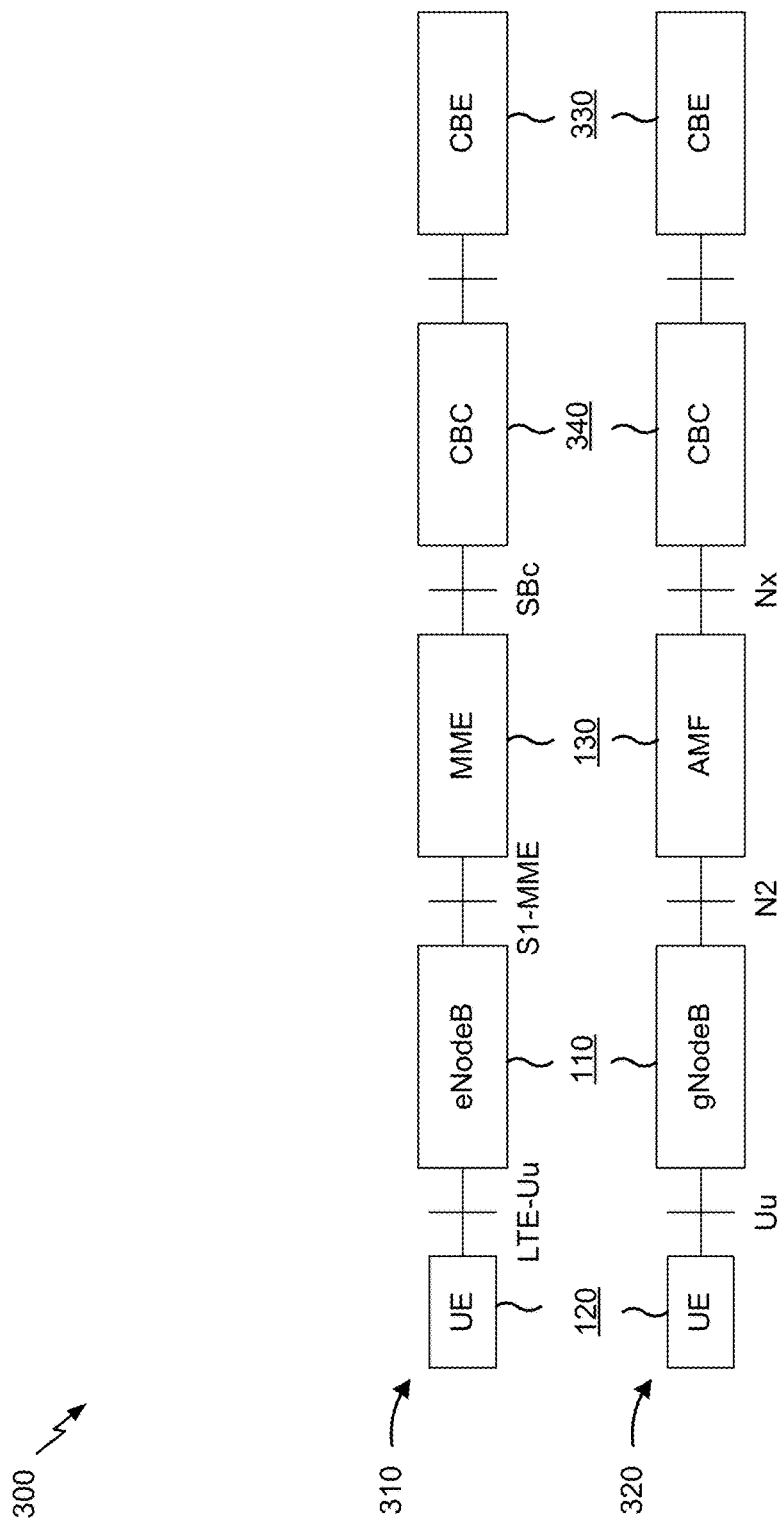
FIGS. 3-5 are diagrams illustrating examples relating to providing notifications in short paging messages, in accordance with various aspects of the present disclosure.

FIG. 3 is a diagram illustrating an example 300 relating to providing notifications in short paging messages, in accordance with various aspects of the present disclosure.

As shown by reference number 310, a UE 120 may access an LTE core network, that includes a network device 130 (e.g., shown as an MME as an example) via a base station 110 (e.g., shown as an eNodeB as an example). As shown by reference number 320, a UE 120 may access a 5G/NR core network, that includes a network device 130 (e.g., shown as an AMF as an example) via a base station 110 (e.g., shown as an gNodeB as an example). In either case, the UE 120 may be capable of receiving public warning system (PWS) notifications (e.g., an earthquake and tsunami warning system (ETWS) notification, a commercial mobile alert system (CMAS) notification, and/or the like), transmitted via a cell broadcast entity (CBE) 330, a cell broadcast center (CBC) 340, the network device 130, and the base station 110 (e.g., via a 3GPP connection). In some aspects, the CBE 330 and the CBC 340 may be part of a cell broadcast service (CBS) network architecture.

A PWS notification may be used to alert the public about emergency events, such as natural emergencies (e.g., earthquakes, tsunamis, hurricanes, floods, tornadoes, severe weather, severe wind, and/or the like), child abductions, Presidential emergencies, imminent threats, government messages, and/or the like. For example, a PWS notification may include a notification associated with an Earthquake and Tsunami Warning service (ETWS), a notification associated with a commercial mobile alert system (CMAS), a notification and/or message defined by a 3GPP standard (e.g., TS 23.041), and/or the like. In some aspects, a PWS notification may include a message identifier, a serial number, a warning type, warning message contents, and/or the like.

In an emergency, information for a PWS notification may be input to and/or generated by the CBE 330, which may transmit such information to one or more CBCs 340. A CBC 340 may generate the PWS notification using the information, and/or may determine a geographic area to which the PWS notification is to be delivered. The CBC 340 may transmit the PWS notification to one or more network devices 130. Different network devices 130 may be associated with different geographic areas, and may facilitate delivery of PWS notifications to UEs 120 located in geographic areas pertaining to the contents of the PWS notification. A network device 130 may transmit a PWS notification to one or more base stations 110 located in the relevant geographic areas, and the base station(s) 110 may transmit PWS notifications to UEs 120 connected to the base station(s) 110.

In 4G/LTE, a base station 110 may transmit a paging grant to a UE 120 via a physical downlink control channel (PDCCH), and the paging grant may schedule a paging message for the UE 120. For example, the paging grant may include downlink control information (DCI) content that includes cyclic redundancy check (CRC) bits. The CRC bits may be scrambled using a radio network temporary identifier (RNTI), such as a paging RNTI (P-RNTI). The UE 120 may use a P-RNTI assigned to the UE 120 to descramble the paging grant. If the CRC passes after such descrambling, then the UE 120 may determine that there is a paging message available for the UE 120, and may use scheduling information, included in the paging grant, to obtain the paging message on a physical downlink shared channel (PDSCH). The scheduling information may indicate, for example, a location of the paging message (e.g., in time, frequency, and/or the like), a resource allocation for the paging message, a modulation and coding scheme (MCS) for the paging message, and/or the like.

In 4G/LTE, a system information block (SIB) may be used to carry PWS notifications, such as ETWS notifications, CMAS notifications, and/or the like, and a UE 120 may be notified to read system information (e.g., one or more SIBs) when a PWS notification is available. Similarly, a UE 120 may be notified to read system information when there is a change to system information (e.g., a change to one or more SIBs). In these cases, to obtain the PWS notification and/or the updated system information, the UE 120 may need to obtain and descramble a paging grant carried on the PDCCH, determine whether the paging grant is intended for the UE 120 (e.g., by performing a CRC using a P-RNTI), obtain scheduling information from the paging grant if the paging grant is intended for the UE 120, use the scheduling information to obtain a paging message on the PDSCH, read the paging message to determine that the UE 120 needs to obtain system information, and obtain the system information to obtain the PWS notification and/or the updated system information. This process can be time consuming, and may lead to delays in reception of urgent messages, especially PWS notifications. Some techniques and apparatuses described herein reduce delays associated with receiving PWS notifications and/or notifications indicating a change to system information.

As indicated above, FIG. 3 is provided as an example. Other examples are possible and may differ from what was described with respect to FIG. 3.

Figure 4:
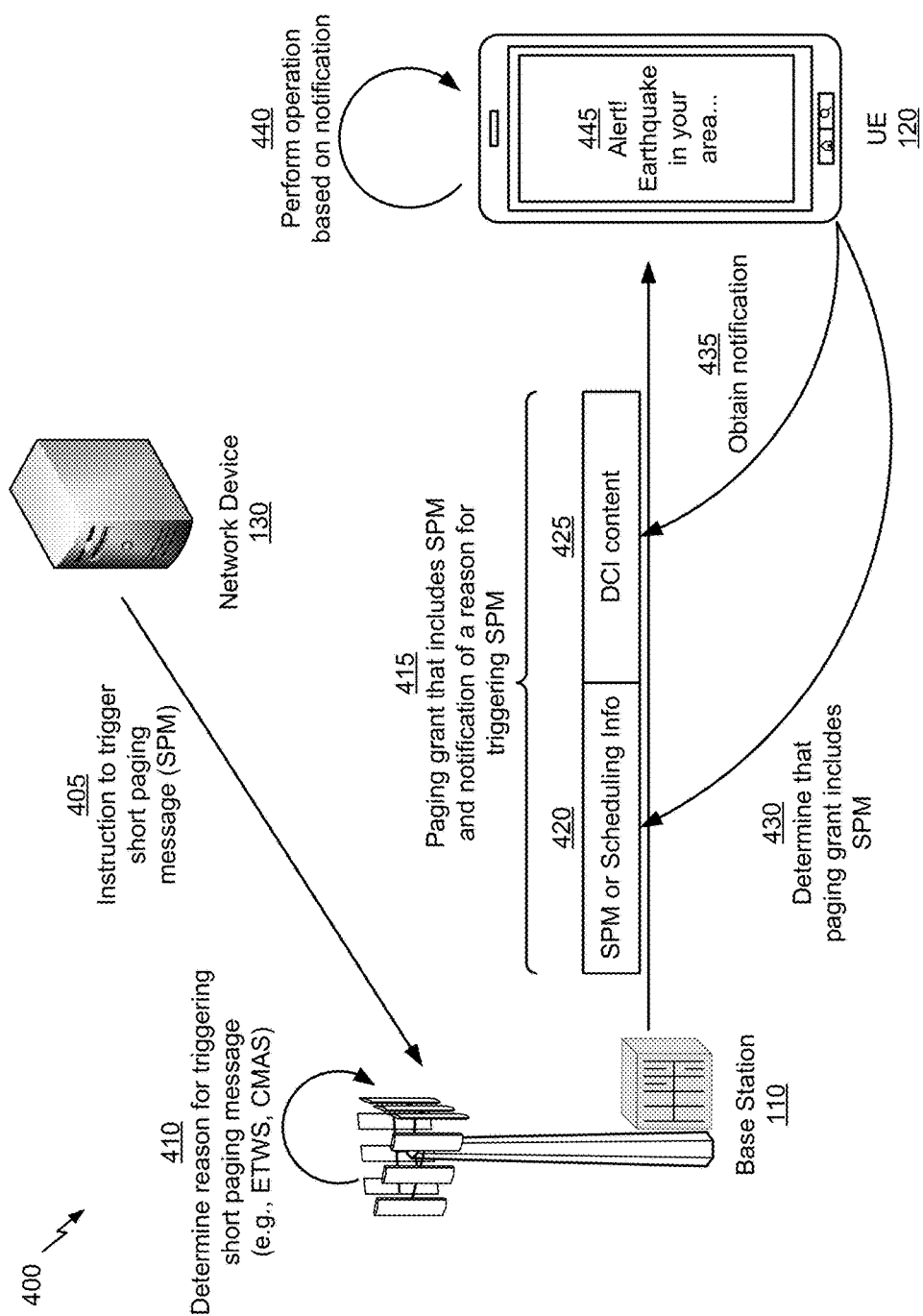

FIG. 4 is a diagram illustrating an example 400 relating to providing notifications in short paging messages, in accordance with various aspects of the present disclosure.

As shown by reference number 405, in some aspects, a network device 130 may transmit, and a base station 110 may receive, an instruction to trigger a short paging message. As described above in connection with FIG. 3, the network device 130 may include an MME, an AMF, and/or the like, and the instruction may include an instruction to transmit a PWS notification (e.g., an ETWS notification, a CMAS notification, and/or the like), an instruction to change system information, and/or the like. In some aspects, the base station 110 may trigger a short paging message without receiving an instruction from another device, such as when the base station 110 determines that system information is to be changed (e.g., based on cell load, channel conditions, and/or the like). A short paging message may be a message transmitted in a paging grant, which may reduce delays associated with obtaining the PWS notification and/or the notification indicating a change to system information, as described below.

As shown by reference number 410, the base station 110 may determine a reason for triggering a short paging message. The reason may include, for example, an ETWS notification, a CMAS notification, a change to system information, and/or the like. In some aspects, the base station 110 may determine the reason for triggering the short paging message based at least in part on information included in an instruction (e.g., received from the network device 130) that triggers transmission of the short paging message. Additionally, or alternatively, the base station 110 may determine the reason for triggering the short paging message based at least in part on a determination by the base station 110 to trigger the short paging message (e.g., without receiving instructions from the network device 130).

As shown by reference number 415, the base station 110 may transmit, and the UE 120 may receive, a paging grant that includes the short paging message and a notification of the reason for triggering the short paging message. In some aspects, the paging grant may be transmitted on a downlink control channel, such as the PDCCH. As shown, the paging grant may include a first portion 420 that indicates whether the paging grant includes a short paging message or scheduling information for obtaining a paging message transmitted via a downlink shared channel, such as the PDSCH. In some aspects, the first portion 420 may include one bit that indicates whether the paging grant includes the short paging message (e.g., when the bit is a first value) or the scheduling information (e.g., when the bit is a second value).

In some aspects, the first portion 420 may be a DCI format field of the paging grant, and a value of the first portion 420 may be used to interpret a second portion 425 of the paging grant. In some aspects, the second portion 425 may include DCI content (e.g., a DCI content field) that includes either content of the short paging message or scheduling information for obtaining a separate paging message (e.g., a paging message not included in the paging grant). If the second portion 425 includes the content of the short paging message, then the second portion 425 may include the notification of the reason that the short paging message was triggered. In this way, important messages may be transmitted in the paging grant (e.g., in the short paging message), thereby reducing a delay in obtaining the message (e.g., by avoiding obtaining of a separate paging message carried in the PDSCH and/or a SIB) and conserving UE resources and base station resources that would otherwise be used to transmit or obtain a separate paging message.

As shown by reference number 430, the UE 120 may determine that the paging grant includes the short paging message. For example, the UE 120 may read the first portion 420 (e.g., a DCI format field) of the paging grant, and may determine that the paging grant includes the short paging message based at least in part on a value of the first portion 420.

As shown by reference number 435, the UE 120 may obtain the notification of the reason that the short paging message was triggered based at least in part on determining that the paging grant includes the short paging message. For example, after reading the first portion 420 and determining that the paging grant includes the short paging message, the UE 120 may interpret one or more bits of the second portion 425 to obtain the notification of the reason that the short paging message was triggered.

In some aspects, the notification may include a PWS notification, such as an ETWS notification, a CMAS notification, and/or the like, as shown in FIG. 4. Additionally, or alternatively, the notification may include a notification of a change to system information, as described in more detail below in connection with FIG. 5. In some aspects, the notification may be two bits in length. In this case, a first value of the two bits may indicate an ETWS notification, a second value of the two bits may indicate a CMAS notification, a third value of the two bits may indicate a change to system information, and a fourth value of the two bits may be reserved and/or may indicate another type of notification.

In some aspects, the DCI content may include a first field to indicate a primary reason for the short paging message (e.g., the ETWS notification, the CMAS notification, the notification of the change to system information, and/or the like), and the first field may include two bits. In some aspects, the DCI content may include a second field that indicates additional information associated with the primary reason, such as additional information associated with the ETWS notification, the CMAS notification, the notification of the change to system information, and/or the like. In some aspects, the DCI content may not include these separate fields, and may include a single field to indicate the primary reason and the additional information. In either case, the notification (e.g., the DCI content) may include a first set of bits to indicate an ETWS notification, a CMAS notification, or a notification of a change to system information, and may include a second set of bits to indicate additional information regarding the ETWS notification, the CMAS notification, or the notification of the change to system information. In some aspects, the first set of bits and the second set of bits may be jointly encoded. In this case, the UE 120 may interpret the second set of bits based at least in part on the first set of bits (e.g., a value of the first set of bits).

For example, the notification may indicate (e.g., using the first field) an ETWS notification, and may indicate (e.g., using the second field) a primary type of ETWS notification. The primary type of ETWS notification may indicate only a tsunami (and not an earthquake), only an earthquake (and not a tsunami), or both a tsunami and an earthquake. In this case, the primary type of ETWS notification may be indicated using, for example, 2 bits. Additionally, or alternatively, the notification may indicate (e.g., using the second field) a secondary type of ETWS notification. The secondary type of ETWS notification may indicate, for example, a location of an epicenter of an earthquake or a tsunami, a distance between the epicenter and an area in which the UE 120 and/or the base station 110 is located, a seismic intensity of the earthquake or the tsunami, a time of arrival of the earthquake or the tsunami (e.g., to the area in which the UE 120 and/or the base station 110 is located), other information associated with the earthquake or the tsunami, and/or the like.

Additionally, or alternatively, the notification may indicate (e.g., using the first field) a CMAS notification, and may indicate (e.g., using the second field) a type of CMAS notification. The type of CMAS notification may include, for example, a first type of a CMAS notification that indicates an order issued by a president or highest authority, a second type of CMAS notification that indicates a threat to residents of an area in which the UE 120 and/or the base station 110 is located, a third type of CMAS notification that includes an amber alert indicating a child abduction, and/or the like. In some aspects, if the type of CMAS notification is the second type, then the notification may further indicate whether the threat is severe, extreme, and/or the like.

Additionally, or alternatively, the notification may indicate a change to remaining minimum system information (RMSI), other system information (OSI), and/or the like, as described in more detail below in connection with FIG. 5.

In some aspects, the UE 120 may obtain the notification without obtaining a paging message carried on a PDSCH. For example, based at least in part on determining that the paging grant includes the short paging message, the UE 120 may obtain the notification in the short paging message, and may prevent searching for and/or obtaining a paging message carried on the PDSCH. In some aspects, the notification may indicate that the notification of the reason for triggering the short paging message is self-contained within the short paging message, and that there is no additional information, regarding the reason, available in a separate paging message and/or a SIB. In this case, the UE 120 may not need to search for and/or obtain a separate paging message and/or the SIB, and the base station 110 may not need to transmit a separate paging message and/or transmit additional information in a SIB, thereby conserving resources of the UE 120 and/or the base station 110 (e.g., memory, processing resources, battery power, and/or the like), conserving network resources, reducing a delay in obtaining the notification, and/or the like.

In some aspects, the notification may indicate that there is additional information, regarding the reason, available in a separate paging message and/or a SIB. In this case, the UE 120 may obtain the separate paging message and/or the SIB and may read contents of the separate paging message and/or the SIB to obtain the additional information. In some aspects, the notification (e.g., DCI content) may include scheduling information for obtaining the separate paging message (e.g., a time and/or frequency location of the separate paging message, a resource allocation, an MCS, and/or the like). Additionally, or alternatively, the notification may include an indication of a SIB that includes the additional information (e.g., SIB1, SIB2, SIB3, and/or the like).

As shown by reference number 440, the UE 120 may perform an operation based at least in part on the notification in the paging grant. As shown in FIG. 4, in some aspects, performing the operation may include outputting information indicated in the notification. For example, the UE 120 may output information included in the notification (e.g., the reason that the short paging message was triggered) based at least in part on determining that the notification is an ETWS notification or a CMAS notification. In some aspects, the UE 120 may provide the information for display, as shown by reference number 445. Additionally, or alternatively, performing the operation may include obtaining system information, as described in more detail below in connection with FIG. 5.

In some aspects, the UE 120 may perform the operation without obtaining a separate paging message on the PDSCH. In this way, the UE 120 may conserve resources that would otherwise be used to obtain the separate paging message. Furthermore, the base station 110 may conserve resources that would otherwise be used to transmit the separate paging message. Furthermore, network resources may be conserved because such network resources may not need to be used to carry the separate paging message.

As indicated above, FIG. 4 is provided as an example. Other examples are possible and may differ from what was described with respect to FIG. 4.

Figure 5:
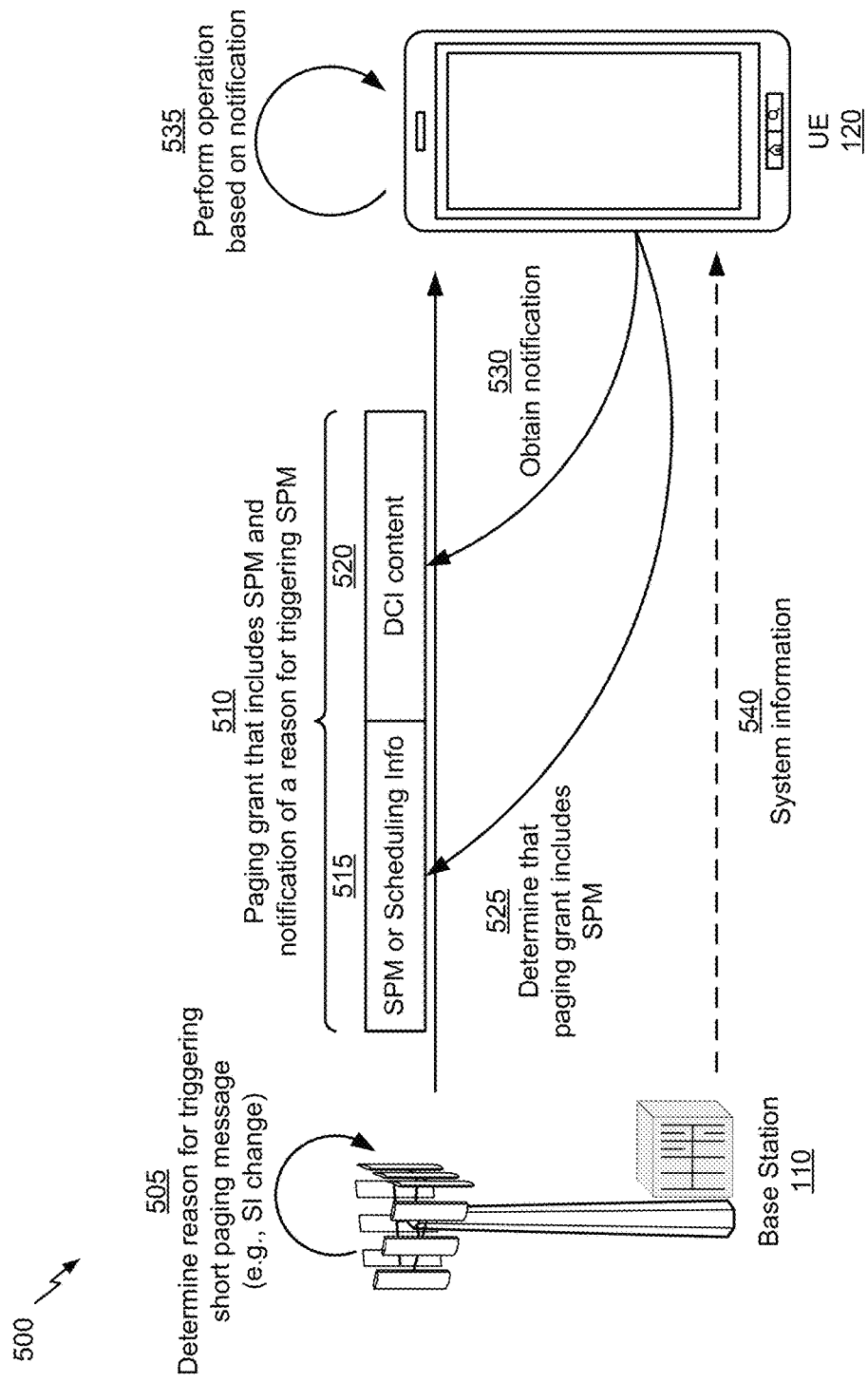

FIG. 5 is a diagram illustrating an example 500 relating to providing notifications in short paging messages, in accordance with various aspects of the present disclosure. FIG. 5 shows example operations that are similar to the example operations described above in connection with FIG. 4. However, the operations described in connection with FIG. 4 focus on aspects of an ETWS notification and/or a CMAS operations, whereas the operations described in connection with FIG. 5 focus on aspects of a notification of a change to system information.

As shown by reference number 505, the base station 110 may determine a reason for triggering a short paging message, in a similar manner as described above in connection with FIG. 4. In some aspects, the base station 110 may determine the reason for triggering the short paging message based at least in part on information included in an instruction (e.g., received from the network device 130) that triggers transmission of the short paging message, a determination by the base station 110 to trigger the short paging message (e.g., without receiving and instructions from the network device 130), and/or the like.

As shown by reference number 510, the base station 110 may transmit, and the UE 120 may receive, a paging grant that includes the short paging message and a notification of the reason for triggering the short paging message, in a similar manner as described above. As shown, the paging grant may include a first portion 515 and a second portion 520, which may correspond to the first portion 420 and the second portion 425, respectively, as described above in connection with FIG. 4.

As shown by reference number 525, the UE 120 may determine that the paging grant includes the short paging message, in a similar manner as described above in connection with FIG. 4. As shown by reference number 530, the UE 120 may obtain the notification of the reason that the short paging message was triggered based at least in part on determining that the paging grant includes the short paging message, in a similar manner as described above in connection with FIG. 4. The notification may include any of the information and/or may take any form described above in connection with FIG. 4.

For example, in some aspects, the notification may include a PWS notification, such as an ETWS notification, a CMAS notification, and/or the like, as described above in connection with FIG. 4. Additionally, or alternatively, the notification may include a notification of a change to system information.

For example, the notification may indicate (e.g., using a first field) a change to remaining minimum system information (RMSI), other system information (OSI), and/or the like. In some aspects, a first value of the first field (e.g., a DCI format field or a DCI content field) may indicate a change to RMSI, and a second value of the first field may indicate a change to OSI. Additionally, or alternatively, the notification may indicate (e.g., using the second field) particular system information that has been changed and/or is to be obtained by the UE 120, a particular SIB that has been changed and/or is to be obtained by the UE 120, and/or the like. Additionally, or alternatively, the notification may directly indicate the change to the system information, such that the UE 120 need not obtain the SIB that carries the system information, thereby conserving resources of the UE 120.

In some aspects, the UE 120 may obtain the notification without obtaining a separate paging message carried on the PDSCH, as described above in connection with FIG. 4. Alternatively, the UE 120 may obtain additional information, regarding the reason for the short paging message, in a separate paging message based at least in part on an indication, in the short paging message, that such additional information is available in the separate paging message, in a similar manner as described above in connection with FIG. 4.

As shown by reference number 535, the UE 120 may perform an operation based at least in part on the notification in the paging grant. As shown in FIG. 5, and by reference number 540, performing the operation may include obtaining system information (e.g., RMSI, OSI, and/or the like). For example, the UE 120 may obtain the system information based at least in part on a determination that the notification is a notification of a change to system information. In this case, the UE 120 may obtain a SIB and may read the system information from the SIB. In some aspects, the UE 120 may perform this operation without obtaining a separate paging message on the PDSCH. In this way, the UE 120 may conserve resources that would otherwise be used to obtain the separate paging message. Furthermore, the base station 110 may conserve resources that would otherwise be used to transmit the separate paging message. Furthermore, network resources may be conserved because such network resources may not need to be used to carry the separate paging message.

As indicated above, FIG. 5 is provided as an example. Other examples are possible and may differ from what was described with respect to FIG. 5.

Figure 6:
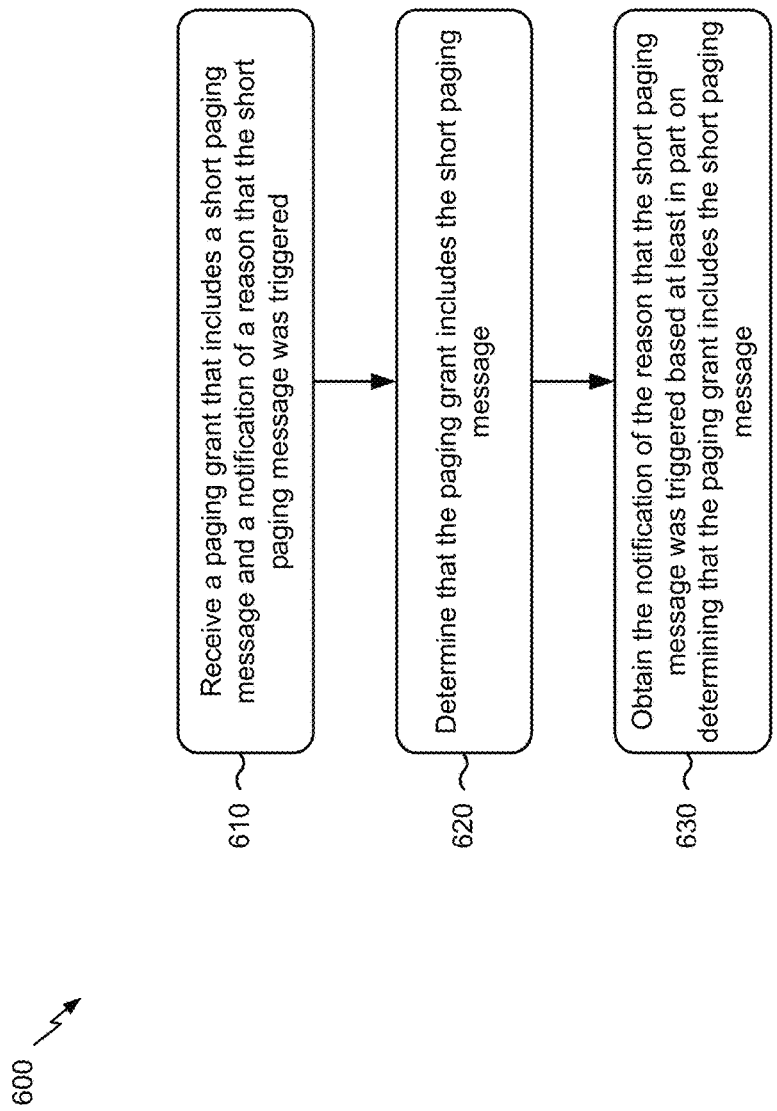
FIGS. 6 and 7 are diagrams illustrating example processes relating to providing notifications in short paging messages, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120 and/or the like) performs operations associated with receiving notifications in short paging messages.

As shown in FIG. 6, in some aspects, process 600 may include receiving a paging grant that includes a short paging message and a notification of a reason that the short paging message was triggered (block 610). For example, the UE (e.g., using antenna 252, DEMOD 254, MIMO detector 256, receive processor 258, controller/processor 280, and/or the like) may receive a paging grant that includes a short paging message and a notification of a reason that the short paging message was triggered, as described above in connection with FIGS. 4-5.

As further shown in FIG. 6, in some aspects, process 600 may include determining that the paging grant includes the short paging message (block 620). For example, the UE (e.g., using controller/processor 280 and/or the like) may determine that the paging grant includes the short paging message, as described above in connection with FIGS. 4-5.

As further shown in FIG. 6, in some aspects, process 600 may include obtaining the notification of the reason that the short paging message was triggered based at least in part on determining that the paging grant includes the short paging message (block 630). For example, the UE (e.g., using controller/processor 280 and/or the like) may obtain the notification of the reason that the short paging message was triggered based at least in part on determining that the paging grant includes the short paging message, as described above in connection with FIGS. 4-5.

Process 600 may include additional aspects, such as any single aspect or any combination of aspects described below and/or in connection with one or more other processes described elsewhere herein.

In some aspects, the notification is obtained without obtaining a separate paging message on a physical downlink shared channel (PDSCH) based at least in part on determining that the paging grant includes the short paging message. In some aspects, the notification indicates that the UE is to obtain a separate paging message or a system information block to obtain additional information regarding the reason of the short paging message. In some aspects, the paging grant further includes at least one of scheduling information for obtaining the separate paging message or an indication of the system information block that includes the additional information. In some aspects, the notification indicates that the notification of the reason is self-contained in the short paging message and that there is no additional information, regarding the reason of the short paging message, available in at least one of a separate paging message or a system information block.

In some aspects, the notification is included in downlink control information (DCI) content included in the paging grant. In some aspects, the paging grant is a paging physical downlink control channel (PDCCH) communication with cyclic redundancy check (CRC) bits that are scrambled with a paging radio network temporary identifier (P-RNTI). In some aspects, the notification includes at least one of: an earthquake and tsunami warning system (ETWS) notification, a commercial mobile alert system (CMAS) notification, a notification of a change to system information, or some combination thereof. In some aspects, the notification is two bits in length.

In some aspects, the notification indicates a primary type of earthquake and tsunami warning system (ETWS) notification, wherein the primary type of ETWS notification indicates a tsunami, an earthquake, or a tsunami and an earthquake. In some aspects, the notification indicates a secondary type of earthquake and tsunami warning system (ETWS) notification, wherein the secondary type of ETWS notification indicates at least one of: a location of an epicenter of an earthquake or a tsunami, a distance between the epicenter and an area in which the UE is located, a seismic intensity of the earthquake or the tsunami, a time of arrival of the earthquake or the tsunami, other information associated with the earthquake or the tsunami, or some combination thereof.

In some aspects, the notification indicates at least one of: a first type of a commercial mobile alert system (CMAS) notification that indicates an order issues by a president or highest authority, a second type of CMAS notification that indicates a threat to residents of an area in which the UE is located, wherein the notification further indicates whether the threat is severe or extreme, a third type of CMAS notification that includes an amber alert indicating a child abduction, or some combination thereof. In some aspects, the notification indicates a change to remaining minimum system information (RMSI) or other system information (OSI).

In some aspects, the notification includes a first set of bits to indicate an earthquake and tsunami warning system (ETWS) notification, a commercial mobile alert system (CMAS) notification, or a notification of a change to system information, and wherein the notification further includes a second set of bits to indicate additional information regarding the ETWS notification, the CMAS notification, or the notification of the change to system information. In some aspects, the first set of bits and the second set of bits are jointly encoded. In some aspects, the UE is configured to interpret the second set of bits based at least in part on the first set of bits.

In some aspects, the UE may perform an operation based at least in part on the notification. In some aspects, the operation is performed without obtaining a separate paging message on a physical downlink shared channel (PDSCH) based at least in part on determining that the paging grant includes the short paging message.

In some aspects, performing the operation comprises outputting information indicated in the notification based at least in part on a determination that the notification is an earthquake and tsunami warning system (ETWS) notification or a commercial mobile alert system (CMAS) notification. In some aspects, outputting the information indicated in the notification comprises providing the information for display. In some aspects, performing the operation comprises obtaining a system information block based at least in part on a determination that the notification is a notification of a change to system information.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
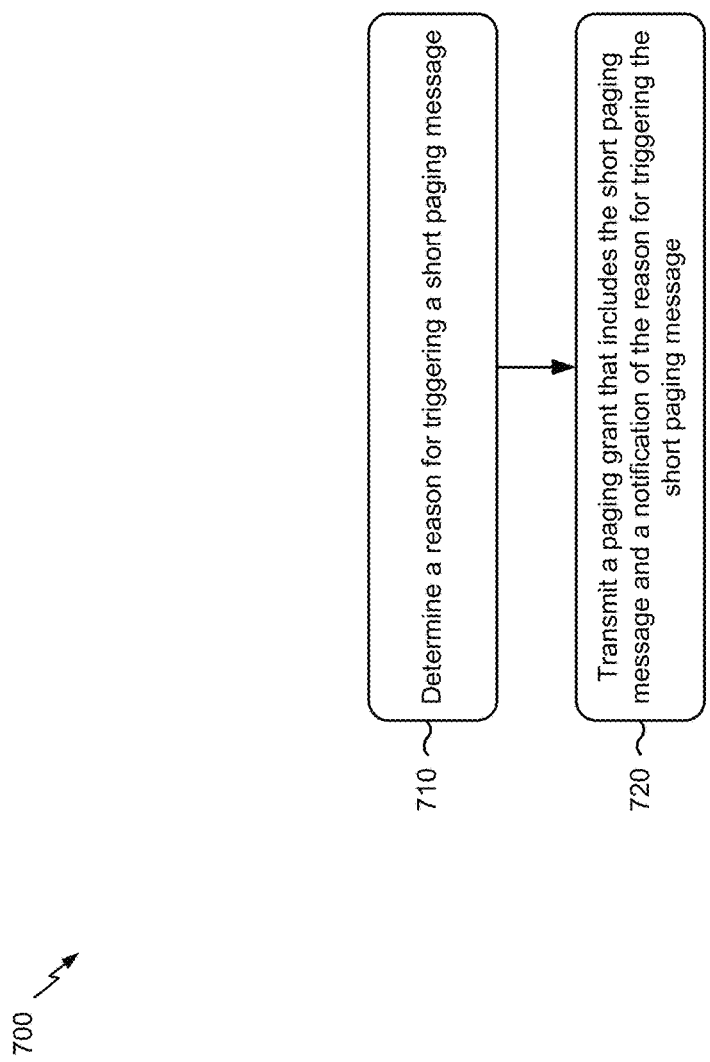

FIG. 7 is a diagram illustrating an example process 700 performed, for example, by a base station, in accordance with various aspects of the present disclosure. Example process 700 is an example where a base station (e.g., base station 110 and/or the like) performs operations associated with providing notifications in short paging messages.

As shown in FIG. 7, in some aspects, process 700 may include determining a reason for triggering a short paging message (block 710). For example, the base station (e.g., using controller/processor 240 and/or the like) may determine a reason for triggering a short paging message, as described above in connection with FIGS. 4-5.

As further shown in FIG. 7, in some aspects, process 700 may include transmitting a paging grant that includes the short paging message and a notification of the reason for triggering the short paging message (block 720). For example, the base station (e.g., using controller/processor 240, transmit processor 220, TX MIMO processor 230, MOD 232, antenna 234, and/or the like) may transmit a paging grant that includes the short paging message and a notification of the reason for triggering the short paging message, as described above in connection with FIGS. 4-5.

Process 700 may include additional aspects, such as any single aspect or any combination of aspects described below and/or in connection with one or more other processes described elsewhere herein.

In some aspects, the reason for triggering the short paging message is determined based at least in part on information included in an instruction that triggers the short paging message. In some aspects, the notification indicates that a user equipment (UE) is to obtain a separate paging message or a system information block to obtain additional information regarding the reason of the short paging message. In some aspects, the paging grant further includes scheduling information for obtaining the separate paging message or an indication of the system information block that includes the additional information. In some aspects, the notification indicates that the notification of the reason is self-contained in the short paging message and that there is no additional information, regarding the reason of the short paging message, available in at least one of a separate paging message or a system information block.

In some aspects, the notification is included in downlink control information (DCI) content included in the paging grant. In some aspects, the notification includes at least one of: an earthquake and tsunami warning system (ETWS) notification, a commercial mobile alert system (CMAS) notification, a notification of a change to system information, or some combination thereof. In some aspects, the notification is two bits in length.

In some aspects, the notification indicates a secondary type of earthquake and tsunami warning system (ETWS) notification, wherein the secondary type of ETWS notification indicates at least one of: a location of an epicenter of an earthquake or a tsunami, a distance between the epicenter and an area in which the base station is located, a seismic intensity of the earthquake or the tsunami, a time of arrival of the earthquake or the tsunami, other information associated with the earthquake or the tsunami, or some combination thereof.

In some aspects, the notification indicates at least one of: a first type of a commercial mobile alert system (CMAS) notification that indicates an order issues by a president or highest authority, a second type of CMAS notification that indicates a threat to residents of an area in which the base station is located, wherein the notification further indicates whether the threat is severe or extreme, a third type of CMAS notification that includes an amber alert indicating a child abduction, or some combination thereof. In some aspects, the notification indicates a change to remaining minimum system information (RMSI) or other system information (OSI).

In some aspects, the notification includes a first set of bits to indicate an earthquake and tsunami warning system (ETWS) notification, a commercial mobile alert system (CMAS) notification, or a notification of a change to system information, and wherein the notification further includes a second set of bits to indicate additional information regarding the ETWS notification, the CMAS notification, or the notification of the change to system information. In some aspects, the first set of bits and the second set of bits are jointly encoded.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a paging grant that includes a short paging message and a notification of a reason that the short paging message was triggered;
   determining that the paging grant includes the short paging message; and
   obtaining the notification of the reason that the short paging message was triggered based at least in part on determining that the paging grant includes the short paging message.

2. The method of claim 1, wherein the notification is obtained without obtaining a separate paging message on a physical downlink shared channel (PDSCH) based at least in part on determining that the paging grant includes the short paging message.

3. The method of claim 1, wherein the notification indicates that the UE is to obtain a separate paging message or a system information block to obtain additional information regarding the reason of the short paging message.

4. The method of claim 3, wherein the paging grant further includes at least one of scheduling information for obtaining the separate paging message or an indication of the system information block that includes the additional information.

5. The method of claim 1, wherein the notification indicates that the notification of the reason is self-contained in the short paging message and that there is no additional information, regarding the reason of the short paging message, available in at least one of a separate paging message or a system information block.

6. The method of claim 1, wherein the notification is included in downlink control information (DCI) content included in the paging grant.

7. The method of claim 1, wherein the paging grant is a paging physical downlink control channel (PDCCH) communication with cyclic redundancy check (CRC) bits that are scrambled with a paging radio network temporary identifier (P-RNTI).

8. The method of claim 1, wherein the notification includes at least one of:
an earthquake and tsunami warning system (ETWS) notification,
a commercial mobile alert system (CMAS) notification,
a notification of a change to system information, or
some combination thereof.

9. The method of claim 1, wherein the notification is two bits in length.

10. The method of claim 1, wherein the notification indicates at least one of:
a primary type of earthquake and tsunami warning system (ETWS) notification,
a secondary type of ETWS notification,
a first type of a commercial mobile alert system (CMAS) notification that indicates an order issues by a president or highest authority,
a second type of CMAS notification that indicates a threat to residents of an area in which the UE is located, wherein the notification further indicates whether the threat is severe or extreme,
a third type of CMAS notification that includes an amber alert indicating a child abduction, or
some combination thereof.

11. The method of claim 1, wherein the notification indicates a change to remaining minimum system information (RMSI) or other system information (OSI).

12. The method of claim 1, wherein the notification includes a first set of bits to indicate an earthquake and tsunami warning system (ETWS) notification, a commercial mobile alert system (CMAS) notification, or a notification of a change to system information, and wherein the notification further includes a second set of bits to indicate additional information regarding the ETWS notification, the CMAS notification, or the notification of the change to system information.

13. The method of claim 12, wherein the first set of bits and the second set of bits are jointly encoded.

14. The method of claim 12, wherein the UE is configured to interpret the second set of bits based at least in part on the first set of bits.

15. The method of claim 1, further comprising performing an operation based at least in part on the notification.

16. The method of claim 15, wherein the operation is performed without obtaining a separate paging message on a physical downlink shared channel (PDSCH) based at least in part on determining that the paging grant includes the short paging message.

17. The method of claim 15, wherein performing the operation comprises outputting information indicated in the notification based at least in part on a determination that the notification is an earthquake and tsunami warning system (ETWS) notification or a commercial mobile alert system (CMAS) notification.

18. The method of claim 17, wherein outputting the information indicated in the notification comprises providing the information for display.

19. The method of claim 15, wherein performing the operation comprises obtaining a system information block based at least in part on a determination that the notification is a notification of a change to system information.

20. A method of wireless communication performed by a base station, comprising:
determining a reason for triggering a short paging message; and
transmitting a paging grant that includes the short paging message and a notification of the reason for triggering the short paging message.

21. The method of claim 20, wherein the reason for triggering the short paging message is determined based at least in part on information included in an instruction that triggers the short paging message.

22. The method of claim 20, wherein the notification indicates that a user equipment (UE) is to obtain a separate paging message or a system information block to obtain additional information regarding the reason of the short paging message.

23. The method of claim 22, wherein the paging grant further includes scheduling information for obtaining the separate paging message or an indication of the system information block that includes the additional information.

24. The method of claim 20, wherein the notification indicates that the notification of the reason is self-contained in the short paging message and that there is no additional information, regarding the reason of the short paging message, available in at least one of a separate paging message or a system information block.

25. The method of claim 20, wherein the notification is included in downlink control information (DCI) content included in the paging grant.

26. The method of claim 20, wherein the notification includes at least one of:
an earthquake and tsunami warning system (ETWS) notification,
a commercial mobile alert system (CMAS) notification,
a notification of a change to system information, or
some combination thereof.

27. The method of claim 20, wherein the notification is two bits in length.

28. The method of claim 20, wherein the notification indicates at least one of:
a primary type of earthquake and tsunami warning system (ETWS) notification,
a secondary type of ETWS notification,
a first type of a commercial mobile alert system (CMAS) notification that indicates an order issues by a president or highest authority, a second type of CMAS notification that indicates a threat to residents of an area in which the base station is located, wherein the notification further indicates whether the threat is severe or extreme, a third type of CMAS notification that includes an amber alert indicating a child abduction, or some combination thereof.

29. The method of claim 20, wherein the notification indicates a change to remaining minimum system information (RMSI) or other system information (OSI).

30. The method of claim 20, wherein the notification includes a first set of bits to indicate an earthquake and tsunami warning system (ETWS) notification, a commercial mobile alert system (CMAS) notification, or a notification of a change to system information, and wherein the notification further includes a second set of bits to indicate additional information regarding the ETWS notification, the CMAS notification, or the notification of the change to system information.

31. The method of claim 30, wherein the first set of bits and the second set of bits are jointly encoded.

32. A user equipment (UE) for wireless communication, comprising:
memory; and
one or more processors operatively coupled to the memory, the memory and the one or more processors configured to:
receive a paging grant that includes a short paging message and a notification of a reason that the short paging message was triggered;
determine that the paging grant includes the short paging message; and
obtain the notification of the reason that the short paging message was triggered based at least in part on determining that the paging grant includes the short paging message.

33. The UE of claim 32, wherein the notification is obtained without obtaining a separate paging message on a physical downlink shared channel (PDSCH) based at least in part on determining that the paging grant includes the short paging message.

34. The UE of claim 32, wherein the notification indicates that the UE is to obtain a separate paging message or a system information block to obtain additional information regarding the reason of the short paging message.

35. The UE of claim 34, wherein the paging grant further includes at least one of scheduling information for obtaining the separate paging message or an indication of the system information block that includes the additional information.

36. The UE of claim 32, wherein the notification indicates that the notification of the reason is self-contained in the short paging message and that there is no additional information, regarding the reason of the short paging message, available in at least one of a separate paging message or a system information block.

37. The UE of claim 32, wherein the notification is included in downlink control information (DCI) content included in the paging grant.

38. The UE of claim 32, wherein the paging grant is a paging physical downlink control channel (PDCCH) communication with cyclic redundancy check (CRC) bits that are scrambled with a paging radio network temporary identifier (P-RNTI).

39. The UE of claim 32, wherein the notification includes at least one of:
an earthquake and tsunami warning system (ETWS) notification,
a commercial mobile alert system (CMAS) notification,
a notification of a change to system information, or
some combination thereof.

40. The UE of claim 32, wherein the notification is two bits in length.

41. A base station for wireless communication, comprising:
memory; and
one or more processors operatively coupled to the memory, the memory and the one or more processors configured to:
determine a reason for triggering a short paging message; and
transmit a paging grant that includes the short paging message and a notification of the reason for triggering the short paging message.

* * * * *